Dec. 30, 1969   O. L. LINSALATO   3,487,348

TEMPERATURE COMPENSATED PRESSURE SWITCH

Filed Feb. 27, 1967

INVENTOR.
ORONZO L. LINSALATO
BY Fulwider, Patton Rieber,
Lee and Utecht
ATTORNEYS

United States Patent Office 3,487,348
Patented Dec. 30, 1969

3,487,348
TEMPERATURE COMPENSATED PRESSURE SWITCH
Oronzo L. Linsalato, San Marino, Calif., assignor to Accessory Products Co. (a Division of Textron, Inc.), Whittier, Calif., a corporation of Rhode Island
Filed Feb. 27, 1967, Ser. No. 618,832
Int. Cl. H01h 37/38
U.S. Cl. 337—320    11 Claims

ABSTRACT OF THE DISCLOSURE

A temperature compensated pressure switch including a housing disposed in heat-exchange relationship with the gas or fluid to be sensed and forming a gas chamber. One wall of the chamber is in the form of an electrically conductive pressure responsive diaphragm, the outer surface of which is exposed to the gas to be sensed, the diaphragm being characterized in that it is moved from an inward inoperative position to an outward operative position by a predetermined pressure acting thereacross. A sample of the gas to be sensed is contained in the chamber and is pressurized to a reference pressure to effect the pressure differential on the diaphragm when the pressure of the gas being sensed is reduced to the actuating pressure. A movable electrical contact is supported centrally on the diaphragm and is moved into contact with a stationary contact supported on the housing to close an electrical circuit when the diaphragm is moved into its operative position.

BACKGROUND OF THE INVENTION

Field of invention

The present invention relates generally to a pressure switch and more particularly to a pressure switch that automatically compensates for pressure differentials that result solely from temperature changes of a contained expandable gas.

Description of prior art

There exist conventional pressure switches utilizing a pressure responsive bellows that contains a sample of gas maintained at a constant reference pressure but none utilize a contained reference gas, or sample of the gas to be sensed, in heat-exchange relationship with the sensed gas to effect a bias on an actuating diaphragm that varies with temperature changes in the sensed gas thereby compensating for such changes.

SUMMARY OF INVENTION

Accordingly an object of the present invention is to provide a pressure switch that will automatically compensate for pressure changes that result solely from changes in the temperature of an expandable gas contained in a closed container.

Another object of the present invention is to provide a pressure switch of the type described that can be easily adjusted to actuate at various selected pressures.

Still another object of the present invention is to provide a pressure switch of the type described that will be actuated when the temperature compensating element fails.

Still another object of the present invention is to provide a pressure switch of the type described that is economical to manufacture and which compensates accurately over a large temperature range.

A more particular object of the present invention is to provide a pressure switch for actuating an electrical circuit in response to the pressure on an expandable contained gas being reduced from relatively high pressure to a relatively low actuating pressure irrespective of changes in the temperature of the fluid. The pressure switch essentially comprises a housing disposed in heat-exchange relationship with said gas and forming a gas sample receiving chamber. One wall of the chamber is in the form of an electrically conductvie pressure responsive diaphragm and its outer surface is exposed to the gas pressure. The diaphragm is flexible so as to have its central portion moved from an inward inoperative position to an outward operative position by a predetermined pressure differential acting thereacross.

The chamber is adapted to receive a sample of expandable gas having substantially the same coefficient of thermal expansion as the gas to be sensed. The sample of gas in the chamber is pressurized to a predetermined reference pressure sufficient for effecting the pressure differential across said diaphragm to force its central portion outward when the gas pressure is reduced to the relatively low pressure.

A movable electrical contact is centrally located on the outer surface of the diaphragm and is supported therefrom. Electrical circuit means are mounted on the housing and include a stationary contact located such that it is spaced from the movable contact when the diaphragm is in the inoperative position and is in contact therewith when the diaphragm is in its operative position.

Other objects and advantages of the present invention will become apparent from consideration of the following description, taken in conjunction with the accompanying drawing.

DESCRIPTION OF PREFERRED EMBODIMENT

Figure 1:
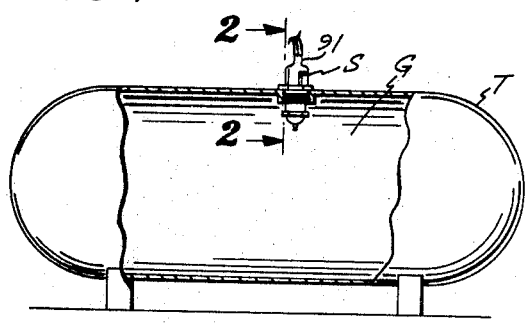
FIG. 1 is a side view, partially in section, of a tank in which a pressure switch embodying the present invention is installed.
Figure 2:
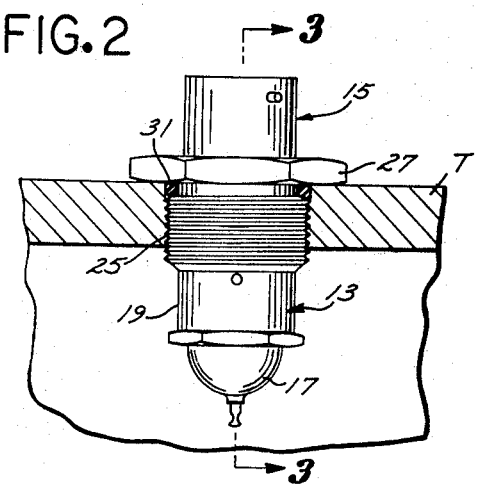
FIG. 2 is a fragmentary elevational sectional view, in enlarged scale, taken along the lines 2—2 of FIG. 1, the mating electrical coupling being removed.

Referring to the drawing, a pressure switch S embodying the present invention is shown in FIG. 1 as being utilized to detect a reduced pressure resulting from leakage from a pressurized tank T. The tank T contains an expandable gas G and an important feature of the switch S is that it is not affected by a pressure reduction caused by cooling of that gas.

The pressure switch S includes a housing, generally designated 13, that is comprised of a base 15 and an end portion 17. The base 15 includes a cylindrical barrel 19 that is partitioned by a transverse wall 21. The barrel 19 has external threads 23 for screwing into internal threads in a bore 25 included in the wall of the tank T. A hexagonal flange 27 for receiving a tightening wrench (not shown) is formed above the threads 23 and a groove 29 is formed immediately therebelow for receiving a sealing O-ring 31. The lower length of the barrel 19 includes internal threads 33 for receiving the externally threaded end portion. 17.

The cylindrical end portion 17 defines a gas sample-receiving chamber 35 and includes a circumferential flange 36 that defines a hexagon for receiving an adjusting wrench. A diaphragm stop 37 extends radially inwardly from the vertical wall of the end portion 17 and defines a central bore 39 and an annular upwardly-facing diaphragm limiting surface 41. A diaphragm mount, generally designated 43, having a cylindrical vertical wall 44 that overfits a step 45 formed in the top of the end portion 17 extends radially inwardly terminating in a central bore 46 and forms an annular downwardly-facing upper diaphragm limiting surface 47.

Figure 3:
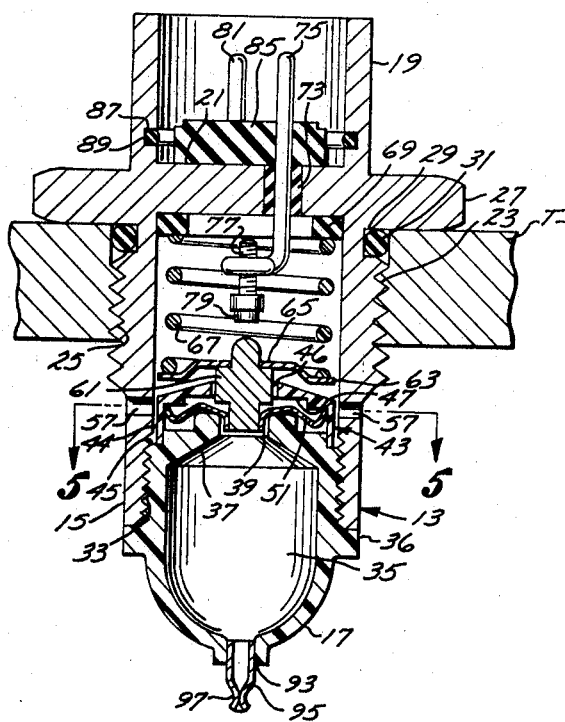
FIG. 3 is an elevational sectional view, in further enlarged scale, taken along the lines 3—3 of FIG. 2, the switch being shown in its inoperative position.

A conventional snap-acting diaphragm 51 made of electrically conductive spring material is pressed into the mount 43 and forms the top wall of the chamber 35. A movable electrical contact 53 is formed centrally on and integrally with the diaphragm 51 and projects upwardly through the bore 46. The diaphragm 51 is formed with a downwardly projected annular corrugation 55 and such corrugation is maintained partially deformed by the wall 44 pressing inwardly on the peripheral edge of the diaphragm. This feature is made apparent by FIGS. 3 and 4, the diaphragm 51 being shown with its central portion pushed downwardly in FIG. 3 and its corrugation 55 greatly deformed and with its central portion moved up in FIG. 4 and its corrugation 55 nearer its relaxed configuration.

Th gas G is communicated to the top surface of the diaphragm 51 through radial sensing ports 57 included intermediately in the barrel 19.

The contact 53 is formed with an intermediate collar 61 and a spring retainer 63 having a central bore 65 is pressed downwardly thereagainst by the bottom end of a coil compression spring 67, the upper end of which spring abuts an electrical insulating washer 69 disposed on the bottom side of the wall 21.

Figure 4:
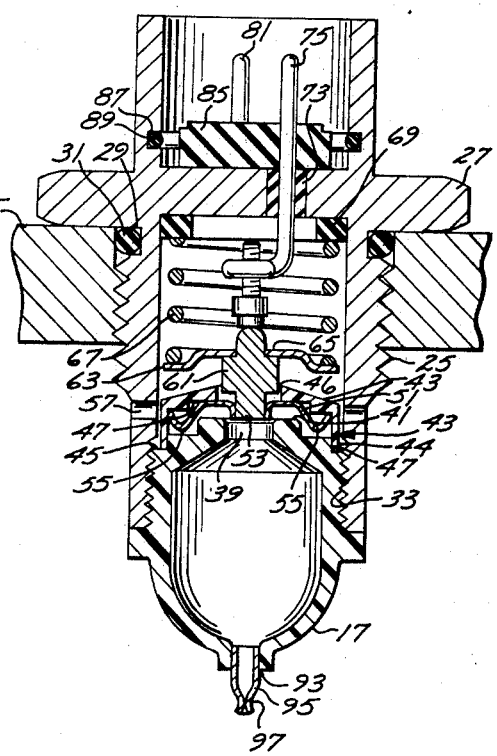
FIG. 4 is an elevational sectional view similar to FIG. 3, but with the switch being shown in its operative position.
Figure 5:
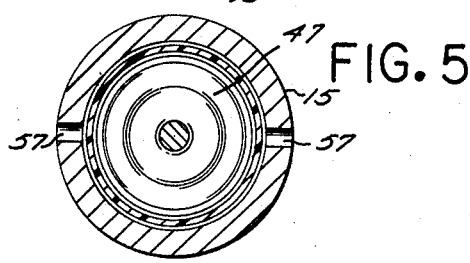
FIG. 5 is a horizontal sectional view taken along the lines 5—5 of FIG. 3.

A vertical bore is formed in the wall 21 and an electrical insulator 73 is pressed thereinto. The insulator 73 has an axial bore and a stiff electrically conductive wire is pressed thereto and projects thereabove to form a positive prong 75 of an electrical plug. The wire 75 is bent and looped at its lower end to form a vertical bore, such bore being threaded to receive the threaded shank 77 of a stationary electrical contact 79. The contact 79 is disposed in the path of the movable contact 53 and can be adjusted upwardly or downwardly to assure that the upper extremity of the contact 53 abuts thereagainst when the diaphragm 51 is snapped up against the upper limiting surface 47, as shown in FIG. 4.

A negative plug prong 81 is supported from the wall 21 for completing an electrical circuit through the positive prong 75, abutting contacts 79 and 53, and housing 15. An electrical insulator 85 having a pair of vertical bores for receiving the prongs 75 and 81 is disposed above the wall 21. An internal groove 87 is machined in the barrel 19 above the wall 21 and receives an O-ring 89 that cooperates with the inner wall (not shown) of the mating electrical coupling 91.

A vertical bore 93 is formed in the bottom end of the portion 17 and a short length of tube 95 is pressed thereinto. The chamber 35 can thus be pressurized to the desired pressure by introducing a sample of the gas G thereinto the tube 95 and pinching the tube off, as at 97, when the desired pressure is reached.

Since accidental leakage into or from the chamber 35 will vary the actuation pressure of the switch S it is desirable to detect such leakage so the malfunctioning switch can be corrected. To this end it is preferable to provide a switch S with such characteristics that the pressure in the chamber 35 is normally below that in the tank T and the inherent upward bias in the snap acting diaphragm 51 is sufficient to overcome the spring bias and snap the contact 53 to its operative position whenever there is leakage into the chamber sufficient to bring the chamber pressure up to a predetermined pressure that is below that of the tank T.

In adjusting the pressure in the chamber 35 and compression of the spring 67 to provide for switch actuation when either the chamber pressure has risen to the pressure in the tank T or the tank has leaked to reduce its pressure to the actuation pressure, the engineer can either calculate workable settings or the switch S can be physically adjusted. Since the switch S is to be actuated whenever the pressure in the chamber 35 rises to the predetermined pressure below the normal pressure in the tank T the spring 67 must be adjusted to effect a sufficiently small bias on the diaphragm 51 so that the inherent diaphragm bias will overcome the spring bias, coupled with the downward pressure differential acting thereon, when the chamber pressure rises to said predetermined pressure. The switch S must also be actuated when the pressure in the tank T falls to the set pressure so the spring 67 must be adjusted to such bias that the upward diaphragm 51 bias will overcome it as well as overcoming or cooperating with, as the case may be, the pressure differential on the diaphragm 51. It will be clear that if the switch actuating pressure in the tank T is less than the chamber pressure, the pressure differential on the diaphragm 51, when the switch is actuated, will be acting upwardly while if the actuating pressure in the tank T is greater than the chamber pressure the differential will be acting downwardly.

When the switch S has been properly adjusted by pressurizing the chamber 35 to the desired pressure and screwing the end portion 17 inwardly or outwardly to effect the desired bias by spring 67, the contact 79 will be screwed upwardly or downwardly to assure that the contacts 53 and 79 are separated when the diaphragm is in its inoperative position and that they are contacting firmly when the diaphragm 51 is in its operative position.

A particular advantage of the switch S is that it will be actuated by leakage into the chamber 35 thus signaling that the reference pressure has changed.

When the switch S is installed in the tank T, if the chamber 35 commences leaking, leakage will be into the chamber and the chamber pressure will approach that of the tank. As pressure in the chamber 35 rises in this manner the downwardly-acting pressure differential on the diaphragm will be decreased until the diaphragm bias overcomes such differential, and bias of the spring 67, to snap the diaphragm upwardly into its operative position and close the contacts 53 and 79. In moving from the inoperative position, FIG. 3, to the operative position, FIG. 4, the central portion of the diaphragm 51 passes through the horizontal plane including the edge of such diaphragm and at that point the corrugation 55 will be compressed to its greatest extent and when such central portion is moved slightly above that plane the diaphragm will snap the contact 53 the remaining distance of its upward travel and securely into contact with the contact 79.

By including a signal (not shown), such as a light or buzzer, in circuit with the mating coupling 91 such contact closure will warn the monitoring workman that either the chamber 35 or tank T has leaked pressure and a quick check of the tank T pressure will indicate that the switch S has malfunctioned.

Most gases have a positive coefficient of thermal expansion over normal temperature ranges so this discussion is directed to a gas possessing such characteristics. When such a gas G is cooled it will contract thus reducing the pressure in the tank T. It will be clear that if the lower surface of diaphragm 51 were not subjected to the chamber pressure such temperature affected pressure reduction would be sensed on the upper surface of the diaphragm only and would cause the diaphragm to actuate thus indicating leakage from the tank T when, in fact, there was no leakage. In the arrangement shown and described, however, since the chamber 35 is submerged in the gas G, whenever the gas experiences a temperature change, such change is likewise experienced by the gas sample in the chamber 35 and the pressure within the chamber will vary accordingly to compensate for the variation in pressure of the gas G.

It will be apparent that, while in the preferred embodiment of the switch S, the contacts 53 and 79 are normally closed they may be rearranged so that they could be normally open. Also, if it were desirable to locate the contacts 53 and 79 outside the tank T to avoid electrical arcing in the tank, there would be no necessity of making the diaphragm 51 out of electrically conductive material but rather it would drive the contact 53 which could be wired into an electrical signal circuit in a conventional manner.

The above discussion has been directed to a switch S including an adjustment spring but it will be clear that such spring is not absolutely essential to operation of the switch since if it were not desirable to have an adjustable switch the spring could be eliminated and the pressure in the chamber 35 merely reduced to effect the additional downward force on the diaphragm that is effected by the spring. This could be accomplished by backing the end portion 17 out of the base 15 sufficiently to remove all bias of the spring 67 from the diaphragm 51.

Also the above discussion has been directed to a tank T containing only a gas G but it will be obvious that if it contained liquid pressurized by a gas the chamber 35 should likewise contain a sample of such liquid and should be pressurized by a sample of such gas to assure the same temperature induced pressure changes in the chamber 35 as occur in the tank T.

From the foregoing it will be obvious that the switch S of the present invention is simple and inexpensive to manufacture and that it provides effective means for indicating a decrease in pressure on an expansive fluid irrespective of temperture variations in the fluid.

Various modifications and changes may be made with regard to the foregoing detailed description without departing from the spirit of the invention or the scope of the following claims.

I claim:

1. A temperature compensated switch for indicating reduction of the pressure of a contained expandable gas from a relatively high pressure to a relatively low pressure, said switch comprising:
   a housing disposed in heat-exchange relationship with said gas and having walls defining a closed gas sample-receiving chamber, one of said walls being in the form of a pressure responsive diaphragm, the outer surface of said diaphragm being exposed to the pressure of said contained gas, said diaphragm being characterized in that it is sufficiently flexible so that its central portion will be moved from an inward inoperative position to an outward operative position in response to a predetermined pressure differential acting thereon, said chamber including a gas sample having substantially the same coefficient of thermal expansion as said gas and further being adapted to be pressurized to a reference pressure sufficient for effecting said pressure differential on said diaphragm to force said central portion outwardly when said gas pressure is reduced to said relatively low pressure;
   a movable electrical contact supported by said diaphragm;
   electrical circuit means mounted on said housing and including a stationary electrical contact located along the path of said movable electrical contact such that said movable contact is spaced from said stationary contact when said diaphragm is in said inward inoperative position and is abutted thereagainst when said diaphragm is in said outward operative position.

2. A temperature compensated pressure switch as set forth in claim 1 wherein said diaphragm is of spring material and includes an inwardly projecting annular corrugation, said diaphragm further being constrained at its edges by said housing to render it snap-acting from said inoperative to said operative position.

3. A temperature compensated switch as set forth in claim 1 wherein said diaphragm is of spring material and is formed such that it inherently biases said central portion toward said operative position and wherein said gas sample-receiving chamber is adapted to be pressurized to a reference pressure below said relatively high pressure, whereby said outward force on said diaphragm effected by said reference pressure will cooperate with said diaphragm bias to flex said diaphragm into said operative position when said expandable gas pressure is reduced to said relatively low pressure.

4. A temperature compensated switch as set forth in claim 3 that includes spring means that bias said central portion of said diaphragm inwardly.

5. A temperature compensated pressure switch as set forth in claim 4 wherein the effective force of said spring means is adjustable for varying said differential pressure required to flex said diaphragm thereby providing for adjustment of said switch for actuation of various selected relatively low gas pressure settings.

6. A temperature compensated switch as set forth in claim 5 wherein said housing constrains said diaphragm at its edge to render it snap-action into said operative position.

7. A temperature compensated switch as set forth in claim 1 that includes:
   a sample of said gas sealed in said chamber and pressurized to said reference pressure.

8. A temperature compensated switch as set forth in claim 1 wherein:
   said electrical circuit means includes a first plug prong mounted on said housing and in electrical circuit with said movable contact, a second plug prong electrically insulated from said housing and formed with a threaded bore, and said stationary contact is formed with a threaded shank for being received in said bore whereby said stationary contact may be adjusted to different selected distances from said movable contact.

9. A temperature compensated switch as set forth in claim 1 wherein:
   said housing is formed with an open end and includes a cup-shaped diaphragm mount telescopically received over said open end and is formed with a throughpassage, and said diaphragm is mounted within said mount and is sealed therewith, said stationary contact being aligned with said passage and said movable contact projecting through said throughpassage for selective engagement with said stationary contact.

10. A temperature compensated switch as set forth in claim 9 wherein:
    said diaphragm is formed with an opening and said movable contact is telescoped into said opening to form a gas-tight seal therewith.

11. A temperature compensated pressure apparatus comprising:
    a pressure vessel formed with a gas chamber;
    a gas contained in said chamber;
    a switch including a housing formed with a chamber disposed in heat exchange relationship with said gas and having one wall in the form of a pressure responsive member having one side in communication with said gas, said pressure responsive member being sufficiently flexible to enable a predetermined pressure differential acting thereacross to move said member from an inoperative position to an operative position, said chamber including a gas sample having substantially the same coefficient of thermal expansion as said first mentioned gas and being pressurized to a reference pressure sufficient to effect said predetermined pressure differential across said pressure responsive member when the pressure in said vessel is reduced to a selected pressure.
    a stationary contact mounted on said housing;
    a movable contact carried on said pressure responsive member and disposed in engageable alignment with said stationary contact, said contacts being spaced apart when said pressure responsive member is in its inoperative position and being engaged when said member is in its operative position whereby said gas sample will be responsive to temperature changes in said gas to alter the pressure in said chamber to compensate for pressure changes in said vessel caused solely by temperature changes.

References Cited

UNITED STATES PATENTS 1,781,289  11/1930  Levy _____ 200—140 X
2,318,480  5/1943  Griffith _____ 200—140
2,582,483  1/1952  Hallerberg.

BERNARD A. GILHEANY, Primary Examiner

H. B. GILSON, Assistant Examiner

U.S. Cl. X.R.

337—306